Nov. 23, 1965    R. L. HAND, JR., ET AL    3,219,824
COMPACT INFRARED SEARCH SYSTEM
Filed April 18, 1962                       2 Sheets-Sheet 1

INVENTORS.
ROSS LOWELL HAND, JR.
ELVIN S. BRUMFIELD
EDGAR W. KUTZSCHER
BY
George C. Sullivan
          Agent

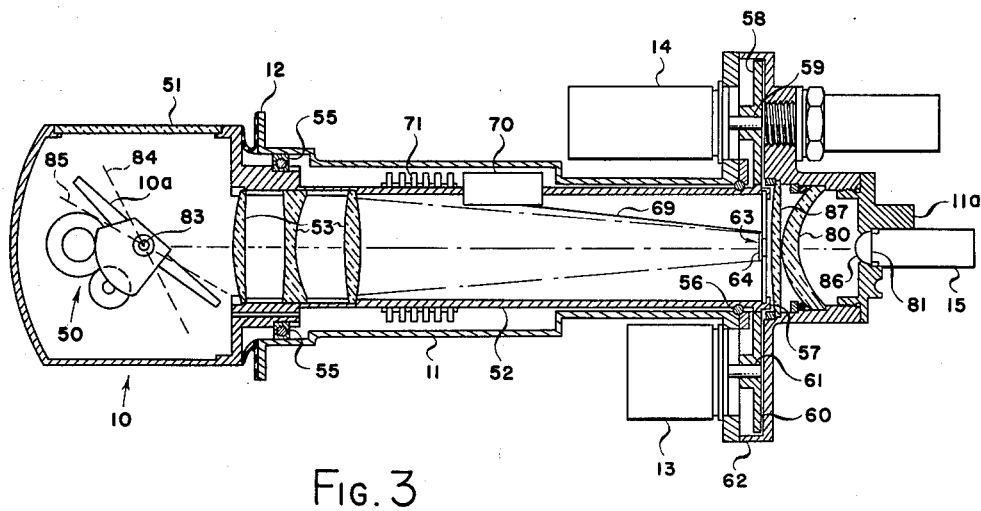

United States Patent Office 3,219,824
Patented Nov. 23, 1965

3,219,824
COMPACT INFRARED SEARCH SYSTEM
Ross Lowell Hand, Jr., Sun Valley, Elvin S. Brumfield, Temple City, and Edgar W. Kutzscher, Sherman Oaks, Calif., assignors to Lockheed Aircraft Corporation, Burbank, Calif.
Filed Apr. 18, 1962, Ser. No. 188,444
6 Claims. (Cl. 250—83.3)

This invention relates to infrared target detection systems and more particularly to an infrared search instrument suitable for use in small aircraft or small boats, or ground operated vehicles.

The device of this invention provides a means whereby a pilot of small craft, on land, in the air, or at sea, can be alerted to other craft, or objects, in its vicinity by an indication of the presence thereof detected by a novel infrared search instrument.

The novel search instrument conceives a fixed infrared detector element directly connected to its associated amplifier, a small reticle in front of the detector, a field lens system for focusing target images on the detector through the reticle, and a diagonal mirror assembly which rotates 360° in azimuth and may be adjusted over a limited range in elevation. The target data is read out on a simplified data display system providing direct readings in azimuth indication over 360° and elevation information over ranges of ±5° at centers of 0°+5° and −5°. One element of the field lens assembly is made of germanium to limit the range of spectral sensitivity so as to reduce the sensitivity to exposure if the search unit should scan across the sun or other sky radiations.

Accordingly it is an object of this invention to provide an infrared search system for small aircraft or small boats which is simple to operate and provides the pilot with an indication of the presence of objects or other craft in the vicinity of the aircraft or boat.

It is a further object of this invention to provide a proximity warning system for a small craft including a simple infrared search device and easily operated indicator display for locating an object or other craft directionally with respect to the location of the small craft.

It is another object of this invention to provide a simple infrared search system wherein minimal equipment is required and operational simplicity achieved through the use of direct connection of an infrared sensor with its associated amplifier and incorporating a 360° optical scanning system which impinges a target image directly on the sensor through a reticle to provide a single frequency signal related to the scanning rate and reticle bar separation.

It is a still further object of this invention to provide in an infrared search system simple means for detecting targets and their azimuth location in a 360° radius about the craft in which the search system is installed, and means for locating the target in elevation, the azimuth and elevation indications being made on a simple display system.

It is yet another object of this invention to provide in an infrared search system a relatively simple target locating means including a vertically positioned fixed infrared detector excited through reticle from a rotating diagonal mirror to scan a 360° horizon perpendicular to the axis of the detector, the output of the detector thereby producing a single frequency signal in the presence of a target.

These and other objects of this invention may be more fully understood from the specification which follows and the appended claims when taken together with the drawings in which:

FIGURE 3 is a cross-sectional schematic of the search unit, part of the system of the invention; and FIGURE 4 is a schematic detail of the reticle assembly showing the elevation mask unit, a feature of the invention.

Figure 1:
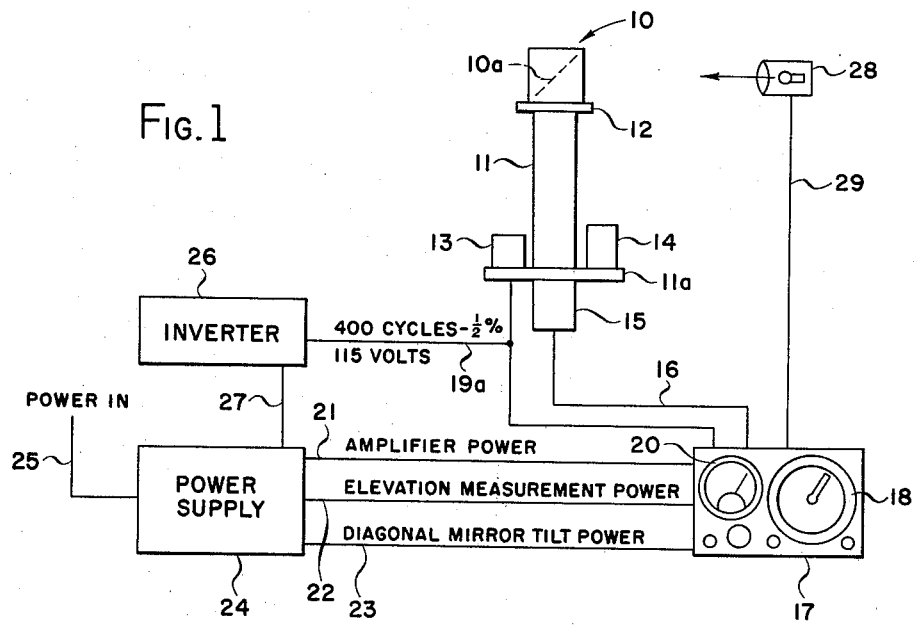
FIGURE 1 is a block diagram of the infrared search system of the invention.

Referring now to FIGURE 1, an overall block diagram of the search system of this invention may be seen. The heart of the system is the rotating search unit 10 which includes a diagonal mirror assembly further described below but indicated generally by dashed line 10a therein. Search unit 10 is rotatable as indicated at 12 on a fixed housing 11 which contains the optical system and infrared detector of the invention shown in FIGURE 3 and described in detail below. Housing 11 is mounted on a base 11a along with an azimuth resolver and its associated equipment 13 and a drive motor 14. An amplifier 15 is provided at base 12a and connected to display and control unit 17 by cable 16. Control unit is more fully illustrated in FIGURE 2 and described below.

On control unit 17 there is an azimuth indicator 18 which is positioned by azimuth resolver 13 electrically connected to it by cable 19.

A power supply 24 deriving its primary power from a source indicated by lead 25 which may be a generator (in an aircraft) or a battery (in a small boat), provides appropriate potentials for amplifier 15 through cables 21 and 16. Power for elevation measurements is provided on cables 22 and 16. Power for tilting diagonal mirror 10a is provided on lead 23. It is to be noted that power for the various elements listed above (amplifier, elevation measurement and diagonal mirror tilt) goes through control and display unit 17 to be operated upon by the various controls thereon.

An inverter 26 deriving primary power from power supply 24 generates a regulated 400 cycle A.-C. potential at 115 volts for resolver 13 connected as shown in FIGURE 1 through cable lead 19a and cable 19. Power supply 24, inverter 26, resolver 13 and amplifier 15 may be considered to be appropriate devices of this nature for performing the functions indicated and similar to other such devices well-known in the electronic arts.

A test unit 28 is provided aligned with search unit 10. The major purpose of test unit 28 is to provide a means for checking sensitivity of the devices of the invention. Test unit 28 also provides a means of establishing a calibration point and may consist of a low intensity infrared source such as a small lamp appropriately filtered to provide a low level test source for the system.

Figure 2:
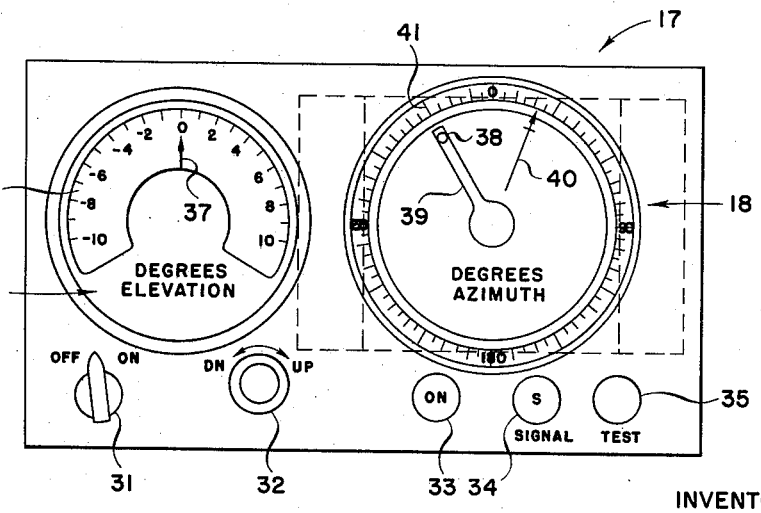
FIGURE 2 is a detail of the control and display indicating portion of the system.

Referring now to FIGURE 2, there is shown the front panel of a control unit and display panel 17 representative of a type which may be used in the search system of this invention, other configurations may be possible to perform the desired function and may occur to those skilled in this art.

On panel 17 there is an azimuth display indicator 18 calibrated about its periphery in azimuth degrees (0°–360°) as indicated at 41. Cursor 40 may be set to show the point at which an alerting lamp 38 lights up as further described below or as indicated elsewhere herein where a paper in a recorder associated with the cursor 40 has been marked. Search direction indicator 39 is rotated as search unit 10 (FIGURE 1) rotates pointing to the azimuth direction in which search window 51 of search unit 10 through which optics 53 look out. (This is further described below.) Near the pointer end of search direction indicator 39, alerting lamp 38 is positioned. Alerting lamp 38 is part of direction indicator 39 and moves with it as indicator 39 rotates. In operation when a target appears in the field of view lamp 38 lights up to warn the operator of the presence of the target and the azimuth direction thereof from the craft.

Cursor 40 may be mechanically linked to direction indicator 39 so as to rotate with it until a target appears at which time the mechanical link between cursor 40 and search direction indicator 39 may be broken, pointer 40 remaining at the target indication point until released manually.

An "on" indicator lamp 33 may be provided on panel 17 along with a signal lamp 34 which may provide an alternative alerting indication to show the operator that at some point in the scanning cycle a target was observed. At this time the operator watches indicator 39 until lamp 38 lights again. The control 35 is used to operate test unit 28 so as to check operation of the unit when no targets are apparent.

Elevation indicator 20 has a scale 36 calibrated over the range of ±10 degrees. Indicator 20 may be in one form a D.-C. meter movement which is electrically converted with the potential applied to drive unit 50 for diagonal mirror 10a. Under the control of elevation knob 32 mirror 10a (and mask 65 shown in FIGURE 4) is adjusted so that the position of meter dial pointer 37 corresponds to the elevation reference angle on scale 36 above or below zero. "Zero" represents an elevation condition perpendicular to the axis of rotation of the search unit. Elevation control knob 32 may be in two parts coaxially operated in which the outer control is indexed for −5°, 0°, or +5° to position mirror 10a. The inner control then controls the position of mark 65 about each of these center points.

Referring now to FIGURE 3, there is shown a partially cross-sectional view of the search unit of the invention. The search unit includes a head 10 within which a diagonal mirror 10a is mounted on a drive and indexing mechanism 50. Mirror 10a looks out of a window or image sensing aperture 51 in head 10 which is provided on one side thereof facing the reflective side of mirror 10a. Head 10 is rigidly mounted on an optical lens barrel 52 to be rotatable therewith. Within barrel 52 and at the search head end thereof, an objective lens system 53 is mounted. Lens system 53 may be of a type known as a Cooke Triplet having a focal length equal to the length of barrel 52. Barrel 52 is rotatably mounted in a fixed housing 11 on bearing races 55 and 56. The outer end 57 of barrel 52 farthest from objective lens system 53 is a peripheral gear. Peripheral gear 57 is engaged with a drive gear 58 on the shaft 59 of a drive motor 14. Peripheral gear 57 is also engaged with a gear 60 on a shaft 61 of resolver 13. Resolver 13 and drive motor 14 are mounted on opposite sides of a platform 62 supporting housing 11 within which lens barrel 52 and search head 10 are rotated on bearings 55 and 56.

A fixed part of the focal plane end 63 of lens barrel 52 and rotatable therewith is the reticle plate forming focal plane end 63 and having inscribed thereon reticle 64 which is formed of alternate opaque and transparent parallel lines each corresponding to a particular angular separation. In an embodiment this distance is .06 degree of rotation of search head 10 in azimuth for a rotational rate of 120° per second to provide a 1000 cycle signal frequency as described elsewhere herein. The reticle 64 as shown in FIGURE 4 has been exaggerated for illustrative purposes.

Thus reticle 64 rotates on its center as barrel 52 is rotated when peripheral gear 57 is driven by drive gear 58. If a target appears through window 51 of head 10 it is reflected by mirror 10a into optical system 53 which focuses the energy onto reticle 64 on plate 63 and the image thereof moves across reticle 64 in a path generally indicated by arcuate dashed line 72 (FIGURE 4).

As may be seen in FIGURE 3 there is fixedly mounted in the base housing 11a behind rotatable reticle and reticle plate 64–63 a field lends assembly 80 which concentrates the energy in the target image appearing on reticle plate 63–64 onto an infrared detector element 81. Detector 81 is fixedly positioned on the center of the axis of rotation of barrel 52 and connected directly to amplifier 15.

One element 87 of the field lens system 80 is made from germanium which will not pass radiation shorter than 1.8 microns. This reduces the target radiation incident onto the detector only a small amount but is very useful in preventing excessive solar and sky radiation from reaching the detector. The discrimination against daytime random noise is greatly improved thereby.

The 1.8 micron filter may be antireflection coated to increase the transmission in the 1.8 to 2.7 micron region. An average transmission of 90 percent can be achieved in this way.

The spectral filter also protects the detector from permanent damage whenever the search unit happens to scan across the sun. The solar energy in the spectral pass band is only 5 percent and thus the maximum energy should not exceed .007 watt per cm.$^2$ or .05 watt on the detector. This energy level is within safe limits.

When a target image, indicated by the dashed line at 72, passes across reticle 64, as the image traverses each opaque and transparent area of the reticle, detector 81 is excited or not as the image appears and disappears on detector assembly 81. These alternations occur at 1000 cycles per second as will be further detailed below and are amplified as an appropriate 1000 cycle signal in amplifier 15. The duration of the signal is equal to the period in which target image 72 appears on reticle 64 during the portion of the scan interval in which the aperture or window 51 of head 10 is in view of the target.

In the usual infrared device, the detector such as 81 must be cooled. In order to simplify the system of this invention, detector 81 is not cooled. A lead sulfide (PbS) detector for example, may be used because of its high sensitivity in the uncooled state. Other detectors of shorter time constant and longer wavelength response do not compare favorably with lead sulfide unless cooled for such applications.

The detector 81 is immersed in a strontium titanate lens as shown at 86 in FIGURE 1. This reduces the cell size and increases the sensitivity inversely proportional to the square root of the area.

The scan rate has been chosen so that a narrow reticle pattern having a spacing of one milliradian does not generate too great a frequency, considering a cell time constant of approximately 200 microseconds. At 1000 cycles per second the cell response will be 63 percent of the D.C. level. The one milliradian reticle width is necessary for good background discrimination.

Returning now to the area within lens barrel 52, it is to be noted that an elevation drive and indexing assembly 50 is provided to position mirror 10a articulating on axis 83. The positions of mirror 10a may be the central one at 45° with respect to the vertical rotational axis of barrel 52, or positions of +5° or −5° with respect to this 45° position, as indicated by dashed lines 84, 85.

Thus with respect to any one of these zero positions, that at 45° as shown at 10a, plus 5° as shown at 84 or minus 5° as shown at 85, an image may be focused on reticle 64 through mirror 10a and the image lens assembly 53.

In order to determine where within each of these three ranges the elevation position of the target is to be found an elevation determining system is provided in the form of a servo motor or voltmeter device 70 within barrel 52 which has a drive shaft or pointer 69 arranged to position a mask 65 over reticle 64. Mask 65 moves in approximately the same plane as the bars of reticle 64 and in the same verticle direction as indicated by arrow 66. In operation under the control of servomechanism or voltmeter device 70 the mask 65 is moved over the target image on reticle 64 until the signal disappears. The movement of mask 65 above or below the zero position is shown on elevation indicator 20 (FIGURE 2) or the scale 36 thereof by the position of pointer 37. Movement of knob 32 controls the location of mask 65.

The movement of the target image along the reticle pattern 72 as a function of elevation angle was discussed above. It is to be noted that the diagonal mirror may be rotated through an angle of ±2½ degrees to change the direction of the field of view by a total of ±5 degrees. Thus it is possible with three positions to have a vertical field of view of either +10 degrees to 0 degrees, or +5 degrees to −5 degrees or 0 degrees to −10 degrees. Since the scanning frequency is a function of the cosine of the elevation angle, it is not possible to extend the elevation angle range without making the system bandwith greater. This may deteriorate the signal-to-noise ratio.

In the normal operating condition the search unit rotates and the target image 72 moves across reticle 64. The target's azimuth position is displayed on indicator 18. However targets will not be delineated as to elevation angle. If the operator wishes to measure the elevation angle of any specific target he has to rotate control knob 32 until the selected target no longer appears on the display unit. At this setting the elevation angle will be displayed on elevation meter 20. Elevation read-out is accomplished in a very simple manner, which eliminates multiple detectors and consequently the need for multiple electronic channels. Briefly, the system operates as follows.

Turning the elevation knob 32 away from zero applies an increasing regulated voltage to voltmeter element 70 built into the side of lens barrel 52.

The pointer 69 of voltmeter element 70 swings along the reticle pattern perpendicular to the bars as shown by arrow 66 covering first the low (−5 degrees) end of the reticle and progressing to the +5 degrees end.

The voltmeter pointer 69 has a special mask 65 which blanks out 3 degrees of the elevation field of view. Thus the operator can blank out targets at any elevation covered by the device and considering the edge of the mask he can locate a target with good accuracy.

The elevation at which blanking occurs is determined by the voltage applied and this voltage is read on elevation meter 20.

Elevation meter 20 is a D.-C. voltmeter calibrated to read from −10 degrees to +10 degrees. When the diagonal mirror 10a is set to the −5 degrees position, it is related to the same voltage which is applied to the elevation meter. When the diagonal mirror is rotated to the horizontal position an additional voltage is applied to raise the reading by 5 degrees. When the mirror is set for 5 degrees up, an additional voltage raises the reading another 5 degrees.

Thus the elevation angle meter reads the correct elevation angle including the corrections for the position of the diagonal mirror 10a. The mirror 10a is indexed by mechanism 50. The voltages applied to indexing mechanism 50 and voltmeter element 70 are applied through slip rings 71 around barrel 52.

The operation of the infrared search unit may be described as follows:

Infrared energy enters through window 51 to head 10 and is directed by mirror 10a downward through refractive optical system 53 to form a small image on reticle 64 located in the focal plane 63. Reticle 64 consists of alternate opaque and infrared transmitting bars which modulate the infrared energy as the barrel 52 rotates. The reticle bar width is .06°.

The frequency of modulation is given by:

$$\text{Frequency} = S/2\ M = \frac{120}{2(0.06)} = 1000 \text{ c.p.s.}$$

where:

$S$ = Scan rate (120° per sec.) and
$M$ = Reticle bar width in degrees (0.06° = 1.05 milliradians)

A target in line with the optical axis of the system will be imaged at the center of the reticle pattern 64. Targets above or below this position will be imaged at another location along the reticle pattern 64. Reticle pattern 64 must be 1.31 inches long in an embodiment of the invention in order to cover the total of 10 degrees elevation field angle for a 7.5 inch focal length, the typical focal length of optical system 53.

The reticle pattern 64 is made 0.26 inch wide to modulate the target radiation for two degrees of azimuth angle. At this width the dwell time for the two degrees of rotation will be $\frac{1}{60}$ second at a scan rate of 120°/sec. This dwell time permits the use of an electrical filter in the amplifier 15 with a 30 cycle per second bandpass. A very good noise attenuation can be achieved this way.

The modulated radiation is concentrated on detector 81 by field lens 80 which has a very short focal length. Experience with the system of the invention shows that it is possible to image energy from all parts of the reticle pattern onto a detector area of 2.5 x 2.5 mm. with such an optical system.

The detector generates a signal voltage which is amplified in the preamplifier 15 and then passes through a filter as noted above. The signal is then amplified again in a power amplifier in display unit 17. Since the target image can be focused anywhere along the vertical dimension of the reticle 64 depending on its elevation angle, there is no direct information showing at which elevation angle the target is located. The first information received is an indication that one or more targets are within the range of the device and the azimuth angle thereof. If the observer needs the elevation angle information for a particular target within the 10 degrees elevation field, he has to operate the target selector knob 32 as described above.

The single channel, single frequency device of this invention greatly simplifies the requirements imposed on its electronic equipment. The optical system used, permits the detector cell 81 to be mounted directly on the preamplifier housing 11a. This eliminates the microphonic noise which is always encountered in even the best "low noise" cable connection.

In keeping with the low noise input, a low microphonic noise is obtained in the preamplifier 15 by using transistors.

To cover the dynamic range encountered for expected target signals, signal clipping circuits are used in the amplifier. The resulting non-sinusoidal signal entering the filter previously described does not affect the output, since the output is influenced only if there is a large target signal.

The target signal passes through a 1000 c.p.s. electric filter with a band pass of 30 c.p.s. This filter limits the system noise so that very low level signal energy can be utilized without difficulty.

The filtered output is amplified again in a solid-state power amplifier in the display unit 17 to bring the output energy to a level sufficient to operate the display indicator.

A unique display unit is used to show target azimuth positions. Space considerations in small craft require that the display unit be reduced to a small physical size. This is possible with the unit of this invention.

The azimuth display is produced on a dial upon which an azimuth cursor has been engraved (see FIGURE 2). The operator rotates the cursor to align with the target of interest which is displayed. The azimuth angle then may be read from the graduated dial.

The target location may also be displayed on a current sensitive or pressure-sensitive paper recorder (not shown) synchronized with the azimuth scan of the infrared device. A stylus part of search direction indicator 39 marks the paper whenever a target signal is present. Thus multiple targets can be displayed and the progress of individual targets can be observed.

Whenever a target signal is encountered, a neon lamp flashes a visual signal to attract the operator's attention. Thus the search device does not require continuous attention.

The operation of the evaluation angle meter and associated control knob has been previously described.

We claim:

1. An infrared search unit for small craft comprising:
   (a) a rotatable search head having an image sensing aperture at one end thereof;
   (b) a reticle rotatable with said head and positioned at a focal plane in an opposite end of said search head;
   (c) elevation determining means including a mask for controllably sweeping said reticle;
   (d) optical means within said head for focusing images appearing in said aperture onto said reticle;
   (e) fixed infrared sensitive detecting means located behind said focal plane for receiving said images and for developing a signal representative thereof;
   (f) amplifying means connected to said detecting means for amplifying said signal; and
   (g) display indicating means coupled with said amplifying means and with said search head for displaying an indication of said image and its location in azimuth and elevation with respect to said small craft.

2. The infrared search unit defined in claim 1 wherein said image sensing aperture in said search head is directed to a view perpendicular to the axis of rotation of said head and said reticle and focal plane are centered on said axis.

3. An infrared search unit for small craft comprising:
   (a) a rotatable search head having mounted therein, a mirror at one end thereof, a reticle positioned upon a focal plane at the other end thereof, an image sensing aperture looking into an azimuth direction from which said mirror may reflect images appearing therein onto said focal plane, optical means for focusing said images appearing in said aperture onto said reticle at said focal plane, and adjustable electro mechanical means for blanking out said image in elevation on said reticle;
   (b) fixed infrared sensitive imaging and detecting means located behind said reticle to receive said images and to develop a signal representative thereof;
   (c) amplifying means connected to said detecting means for amplifying said signal; and
   (d) display indicating means coupled with said amplifying means, with said search head, and with said electro mechanical means, for displaying an indication of said image and its location in azimuth and elevation with respect to said small craft.

4. An infrared search unit for small craft comprising:
   (a) a rotatable search head having at one end a viewing aperture looking out in an azimuth direction perpendicular to the axis of rotation of said head and a mirror positioned therein to reflect images appearing in said aperture along said axis of rotation;
   (b) a reticle located upon a focal plane in the opposite end of said head and being rotatable therewith;
   (c) refractive optical means within said head for focusing images appearing in said aperture onto said reticle;
   (d) a blanking mask positioned in said head for rotation therewith and being reciprocably movable over said reticle responsive to manual inputs;
   (e) a housing adapted to receive said rotatable search head and having means coupled to said head for rotation thereof;
   (f) fixed infrared sensitive imaging and detecting means located in said housing behind said focal plane to receive said images and to develop an alternating signal representative of the passage of said image over said reticle;
   (g) amplifying means connected to said detecting means for amplifying said alternating signal; and
   (h) display indicating means coupled with said amplifying means and with said search head and including means responsive thereto to display an indication thereon of said image and the location of the target producing said image with respect to said small craft.

5. An infrared search unit comprising:
   (a) a housing, a search head inserted in said housing and rotatable therein, said head having an image receiving aperture with a view perpendicular to the axis of rotation of said head, optical means for displaying images appearing in said aperture upon the far end of said head and a reticle upon focal plane at said far end for receiving said images;
   (b) a mask adjacent said reticle and adapted for movement thereover for elevational image location;
   (c) a fixed detection means positioned in said housing in alignment with said axis of rotation and including a stationary detector and a field lens assembly of predetermined spectral sensitivity interposed between said focal plane and said detector for limiting the response of said detector to the range of said predetermined spectral sensitivity in which to generate stable signals corresponding to the images of targets within said range viewed by said search head;
   (d) an amplifying means connected with said detector and including band width limiting means responsive to said signals to amplify said signals with a minimum of extraneous background energy; and
   (e) display indicating means calibrated over the range of 360° for displaying the presence of said target images, said indicating means being connected to said amplifying means and having a luminous indicating element thereon which glows in response to said signals.

6. In an infrared search system, means for detecting the azimuth and elevating position of a target on a single detecting element comprising:
   (a) means defining an imaging plane;
   (b) rotatable means for projecting a target image moving horizontally across said plane, the point on the rotation thereof at which said target image appears on said plane being an indication of the azimuth position of the target;
   (c) means movable substantially perpendicularly to the direction of motion of said target image on said plane, said last means including a mask adjustably positionable between said means for projecting a target image and said image plane; and
   (d) detecting means positioned behind said plane to receive said image, whereby when said mask interrupts said target image, the position of said mask providing an indication of the elevation of the target forming said image.

References Cited by the Examiner

UNITED STATES PATENTS

| | | | |
|---|---|---|---|
| 2,945,414 | 7/1960 | Blackstone | 88—1 |
| 2,949,536 | 8/1960 | Langton. | |
| 3,004,162 | 10/1961 | Menke | 88—1 |
| 3,076,095 | 1/1963 | Becklund | 250—83.3 |
| 3,084,253 | 4/1963 | McHenry et al. | 250—83.3 |
| 3,087,986 | 4/1963 | De Brosse | 88—1 |

FOREIGN PATENTS 971,883 1/1951 France.

RALPH G. NILSON, *Primary Examiner.*

MAYNARD R. WILBUR, *Examiner.*